Patented Oct. 24, 1933

1,931,813

UNITED STATES PATENT OFFICE 1,931,813

ALIMENTARY SUBSTANCE AND PROCESS FOR MAKING THE SAME

Frederick S. Beverley, Chicago, Ill., assignor to Kraft-Phenix Cheese Corporation, Chicago, Ill., a corporation of Delaware No Drawing. Application March 3, 1933
Serial No. 659,592

3 Claims. (Cl. 99—11)

The invention relates to improvements in an alimentary substance in the nature of a dairy product suitable for purposes such as candy manufacture, etc., and put up in such form that it can be conveniently shipped from the source of manufacture to any place where it is desired to use the same.

The principal object of the invention is to provide a material or substance of the class described, which is composed largely of milk in concentrated form, which is so treated that it can be shipped for a considerable distance and stored under ordinary atmospheric conditions for a considerable time before deterioration occurs, and which is without any objectionable taste or flavor; which is extremely palatable; which is of the proper consistency, body, texture and hardness to permit rapid and efficient subdividing thereof into small units with economy; to provide an improved process for producing said novel and useful alimentary substance, and in general, to provide an improved material and process of the character referred to.

Condensed milk, i. e., milk containing a considerable percentage of sugar and which is about the consistency of heavy cream, is an extremely old product, as also is milk powder, but so far as I am aware, no one heretofore has been able to produce a palatable concentrated milk which has what may be termed an "in-between" consistency such as that of dough or putty.

I have discovered how to produce such a material which I have successfully made by the following process:

*Example.*—I have found that the desired physical consistency may be obtained when the material has the following general formula:

Milk solids about 65%; sugar about 20%; water about 15%. An actual analysis of the finished material as shipped, resulted as follows: Milk solids 66%; sugar 20%, water 14%.

Sufficient sugar is employed to combine with the water content to form a tempering agent for the milk solids, in about the same way that an oil serves as a tempering agent in ordinary putty. If too low in sugar, the material will be of too creamy a consistency to stand shipment or such handling as it must be subjected to in the manufacture of candy, or if it be further dried in an attempt to correct this too liquid condition, there will result a solid, frangible material which cannot be sliced or otherwise handled.

A high percentage of sugar also has a valuable preserving function and for this reason alone it is advantageous to use as high a percentage of sugar as possible, although care should be taken not to increase the sugar content to the point where there will be insufficient water present to prevent crystallization.

In practicing the process, I have obtained good results in employing the "batch" method, using this term in its broad sense as defining a process wherein the material is completed as a batch, although the raw ingredients may be added from time to time as the process continues.

Ordinarily, it will be found convenient to add the sugar in the required amount, to whole milk or skimmed milk, depending upon whether skim or whole milk is available or whether the user desires the material with or without its butter content.

This sweetened liquid is then introduced into a suitable drying apparatus of the vacuum type and preferably of the internal rotary type or of such construction that the material will be repeatedly tumbled and intermixed or kneaded. A sufficient vacuum is employed to prevent the temperature of the material from rising above 130° F. The raw material may be introduced into the apparatus from time to time as the drying proceeds and until a sufficiently large batch has been injected or otherwise introduced and the removal of moisture in the mechanical treatment above described is continued until the material has reached such condition that when cooled it will have the required consistency. This condition may be judged by visual inspection.

When the treatment has progressed to the desired stage, the application of heat is arrested and the container of the charge is artificially cooled as quickly as is conveniently possible, until the temperature of the apparatus and the contained material has been lowered considerably, say to 80° F., whereupon the vacuum is broken and the charge is removed.

The finished material is of the consistency above described and has all of the desirable properties and characteristics above referred to. For shipping purposes, it may be packed in cartons and it is not necessary to seal the same in metal or other similar liquid-tight containers.

The usual objectionable "cooked milk" flavor of products of this general character is absent of my improved material, which absence is due to the fact that the albumen of the milk is in substantially its original or natural condition, which can be proved by adding water to the product, whereupon the material is brought back to its original condition of sweetened milk, in every important and substantial respect.

This natural condition of the albumen is preserved throughout the process of treatment, by reason of the fact that the temperature of the albumen has never been raised about 130° F., and also because the process is conducted entirely in vacuo, so that all danger of excessive air during the concentration period is eliminated.

I claim as my invention:

1. An alimentary substance comprising milk solids and containing the albumen in substantially its natural chemical condition, with water and sugar in an amount approximately enough to form a substantially saturated syrup at room temperatures, the substance containing sufficient syrup to temper the material so that it has a non-liquid consistency but is capable of being severed by a knife without crumbling or shattering, and having a composition of approximately 65 per cent milk solids, 15 per cent water, and 20 per cent sugar.

2. The improved process which consists in adding sugar to milk in such an amount that the sugar content in the final product will be about 20 per cent, then evaporating the liquid at a temperature not above 130 degrees F., while agitating the material, until the water content has been reduced to above 15 per cent, and then cooling the material, the material being maintained under vacuum to the extent necessary to prevent the temperature from at any time rising above 130° F.

3. The improved process which consists in adding sugar to milk in such an amount that the sugar content in the final product will be about 20 per cent, then evaporating the liquid in vacuo at a temperature not above 130 degrees F., while agitating the material, until the water content has been reduced to about 15 per cent, and then cooling the material to substantially room temperature while substantially maintaining the vacuum.

FREDERICK S. BEVERLEY.